(12) United States Patent
Robbin (10) Patent No.: US 9,228,272 B2
(45) Date of Patent: Jan. 5, 2016

(54) SYSTEM FOR DIP COATING ARTICLES (75) Inventor: Joerg Robbin, Ammerbuch-Pfaeffingen (DE)

(73) Assignee: EISENMANN AG, Boeblingen (DE)

(*) Notice: Subject to any disclaimer, the term of this patent is extended or adjusted under 35 U.S.C. 154(b) by 0 days.

(21) Appl. No.: 14/000,511

(22) PCT Filed: Feb. 7, 2012

(86) PCT No.: PCT/EP2012/000535
§ 371 (c)(1),
(2), (4) Date: Oct. 2, 2013

(87) PCT Pub. No.: WO2012/113506
PCT Pub. Date: Aug. 30, 2012

(65) Prior Publication Data
US 2014/0021054 A1     Jan. 23, 2014

(30) Foreign Application Priority Data
Feb. 21, 2011    (DE) .......................... 10 2011 011 901

(51) Int. Cl.
*C25D 13/00* (2006.01)
*B05C 3/10* (2006.01)
*B65G 49/04* (2006.01)

(52) U.S. Cl.
CPC . *C25D 13/00* (2013.01); *B05C 3/10* (2013.01); *B65G 49/0459* (2013.01); *B65G 49/0486* (2013.01); *B65G 2201/0294* (2013.01)

(58) Field of Classification Search
CPC .. B05C 3/10; B65G 49/0459; B65G 49/0486; B65G 2201/0294; B65G 49/02; B65G 49/025; B65G 49/0413; B65G 49/0463; B62D 65/18; C25D 13/00

USPC ......................................................... 204/623
See application file for complete search history.

(56) References Cited

U.S. PATENT DOCUMENTS

| 5,657,822 | A | 8/1997 | James et al. | |
| 5,725,669 | A | 3/1998 | Heckmann | |
| 6,308,404 | B1 * | 10/2001 | Hirschmann et al. | ........... 29/822 |
| 6,372,107 | B1 | 4/2002 | Besinger et al. | |
| 7,393,444 | B2 | 7/2008 | Ehrenleitner | |
| 2005/0025612 | A1 | 2/2005 | Ehrenleitner | |
| 2007/0062060 | A1 | 3/2007 | Swoboda | |
| 2012/0097099 | A1 | 4/2012 | Roeckle | |

FOREIGN PATENT DOCUMENTS

DE    10 333 148    2/2005

* cited by examiner

*Primary Examiner* — Xiuyu Tai
(74) *Attorney, Agent, or Firm* — Factor Intellectual Property Law Group, Ltd.

(57) ABSTRACT

A system for dip coating articles, in particular vehicle bodies, which articles can be moved to at least one dip tank and away from it with the aid of a transport system. For being lowered into and raised out of the tank, they are placed onto a rotating platform of at least one stationary rotating station and are dipped into the treatment liquid and removed from it by rotation of the rotating platform. Each article is fastened with the aid of a fastening device on a skid which interacts with the transport system. The fastening device is configured such that the article fastened to the fastening device is at a smaller spacing from the rotating platform in the removed position than in the second, dipped position.

2 Claims, 12 Drawing Sheets

SYSTEM FOR DIP COATING ARTICLES

RELATED APPLICATIONS

This application claims the filing benefit of International Patent Application No. PCT/EP2012/000535, filed Feb. 7, 2012, which claims the filing benefit of German Patent Application No. 10 2011 011 901.9 filed Feb. 21, 2011, the contents of both of which are incorporated herein by reference.

FIELD OF THE INVENTION

The invention relates to a system for dip coating articles, in particular vehicle bodies, having
a) at least one dip tank which may be filled with a treatment liquid up to a certain level;
b) a transport system which moves the articles up to and away from the dip tank;
c) at least one stationary turning station which is provided at the dip tank and has a turning platform, on which at least one article is fastened in each case and which may be turned between a first position in which the article is above the level of the treatment liquid and a second position in which the article is below the level of the treatment liquid, and/or may be turned in the opposite direction between these two positions;
wherein
d) each article may be fastened, by means of a fastening device, to a skid which cooperates with the transport system and may be fixed on the turning platform of the turning station, wherein the skid has a basic frame and a fastening device for the article.

BACKGROUND OF THE INVENTION

Systems of this kind are described for example in DE 43 04 145 C1 or EP 0 749 395 B1. There, the skids used are substantially inherently rigid constructions in which the vehicle body placed thereon cannot move in relation to the basic frame. The platforms of the turning stations on which the skids having the vehicle bodies are placed are connected to the rotational axle of the respective turning station by way of relatively long guide rods. This is required in order to bring the vehicle bodies actually below the level of the treatment liquid in the dip tank on turning through 180°, since the rotational axle itself is to be outside the treatment liquid. As a result of this, the height at which the vehicle body is located within the turning station is relatively great, which is reflected in a corresponding height level in the transport systems that guide them into position and away therefrom. However, a height of this kind is undesirable, in particular in the upstream and downstream parts of the system through which the vehicle bodies are to be guided on the same skids.

It is an object of the present invention to construct a system of the type mentioned at the outset such that the position of the unclipped articles on the turning station is as low down as possible.

SUMMARY OF THE INVENTION

This object may be achieved according to the invention in that
e) the fastening device of the skid is constructed such that the spacing between the article and the basic frame of the skid changes during turning on the turning platform of the turning station such that the article fastened on the fastening device is at a smaller spacing from the turning platform in the first position, raised from dipping, than in the second, dipped position.

Thus, according to the invention the concept of conventional skids, namely to fasten the vehicle body to the basic frame of the skid completely rigidly and immovably, is abandoned. Instead, the article is given the freedom to move in a fully defined way in relation to the basic frame of the skid under the effect of gravity, and where appropriate also under the effect of an active drive, during the turning movement in the turning station. Gravity or the drive device ensure that the article is brought as close as possible to the basic frame of the skid in the position raised from dipping, in which it is above the rotational axle. During turning of the turning platform, however, the degree of freedom afforded to the fastening device becomes more significant and allows gravity to draw the article away from the basic frame. After turning through 180°, whereupon the article to a certain extent lies on its "back", it is then at the maximum spacing from the basic frame and hence also from the rotational axle. In this way, it is possible despite a relatively small spacing between the turning platform and the rotational axle of the turning station to put the articles to be treated in the dip tank entirely below the level of the treatment liquid.

In a preferred embodiment of the invention, the fastening device has a retaining structure for the article, on which at least two pivotal arms are articulated at one end and are connected in articulated manner at their other end to the basic frame of the skid such that a parallelogram guidance of the retaining structure in relation to the basic frame is produced. In this embodiment, in the condition raised from dipping the pivotal arms form an acute angle with the basic frame of the skid, and during turning of the turning platform this angle becomes progressively wider and attains a value of 90° once turning through 180° has been performed.

As an alternative, the retaining structure may be connected to the basic frame by way of a scissor arrangement or indeed a telescopic device. The scissor arrangement or telescopic device also permits the retaining structure and hence the article to move in relation to the basic frame under the effect of gravity in certain turning positions of the turning platform.

It is further advantageous if, on their runners, the skids have rollers which cooperate with guide rails on the turning platform of the turning station. In this way the skids may be used unchanged in all regions of the system where they are moved using conventional transport systems. By contrast, on the turning platform their rollers come into operation and can move in the guide rails of the turning platform. Simple slide devices may be used to move the skids up onto the turning platform and down therefrom.

Finally, it is advantageous if the fastening device has a damping device which decelerates the gravity-effected movement of the article in relation to the basic frame of the skid. In this way, the speed at which the article moves in relation to the basic frame under the effect of gravity can be limited to the desired amount.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

An exemplary embodiment of the invention will be explained in more detail below with reference to the drawing, in which.

DETAILED DESCRIPTION OF THE PRESENT INVENTION

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Figure 1:
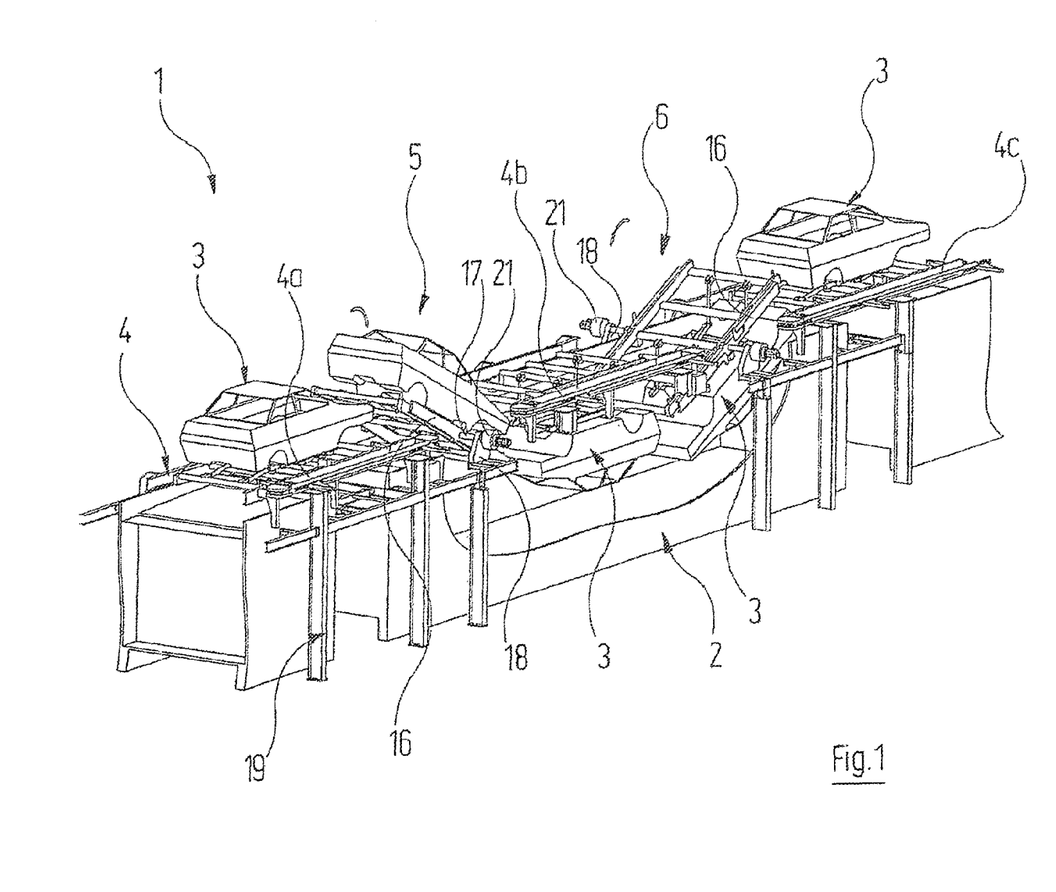
FIG. 1 shows, in perspective, parts of a system for the electrophoretic dip coating of vehicle bodies.
Figure 2:
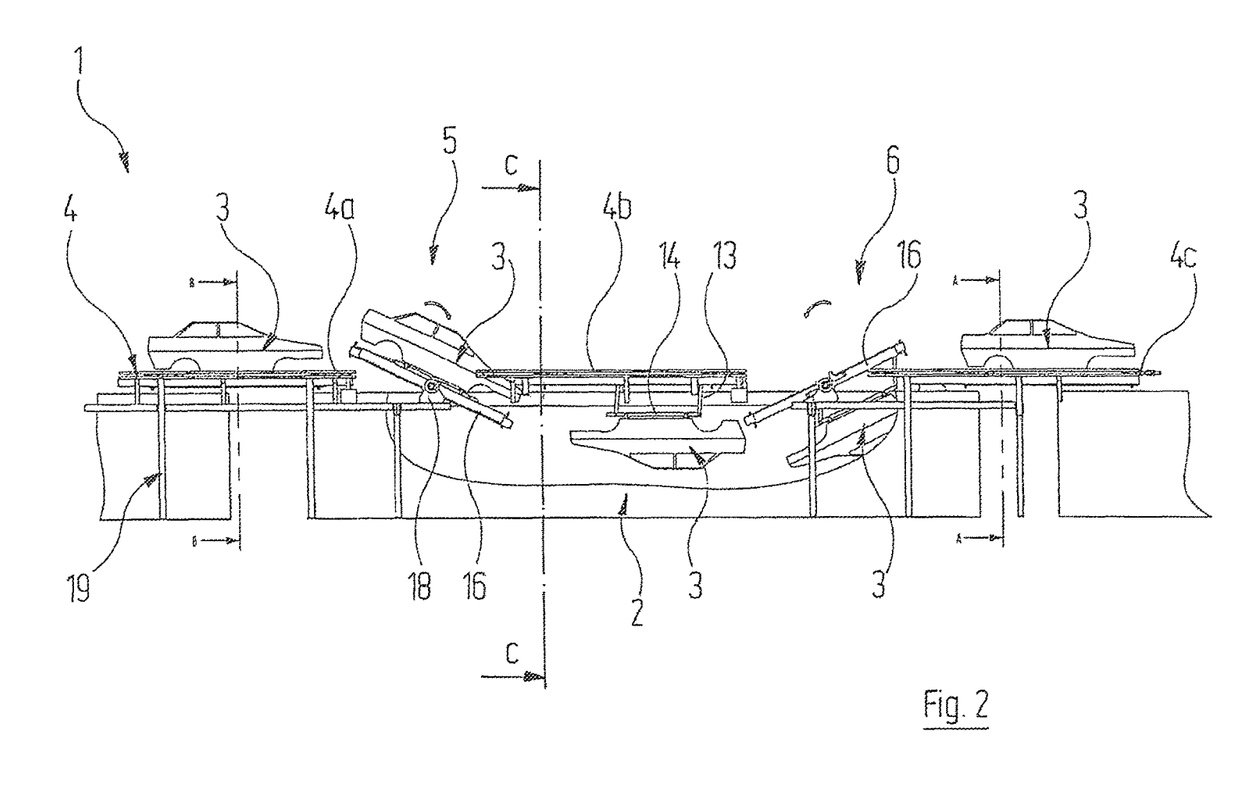
FIG. 2 shows the side view of the system from FIG. 1.
Figure 3:
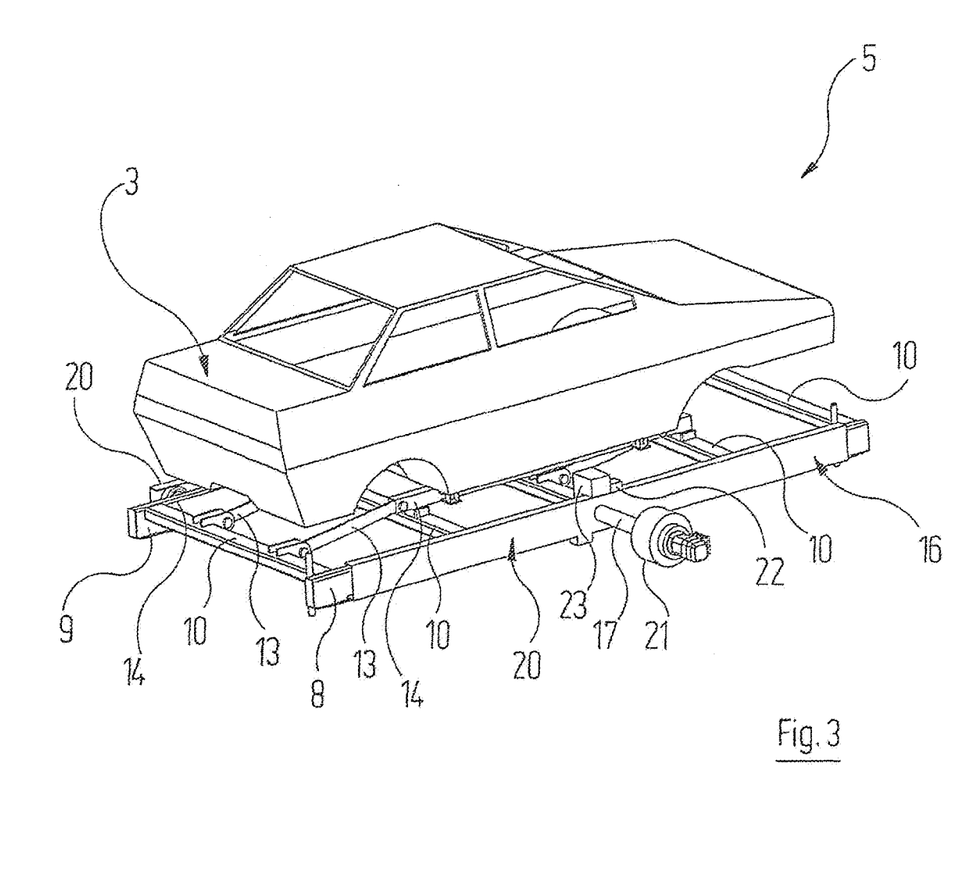
FIG. 3 shows, on a larger scale and in perspective, a turning platform with a vehicle body placed thereon as used in the system from FIG. 1, in a first turning position.
Figure 4:
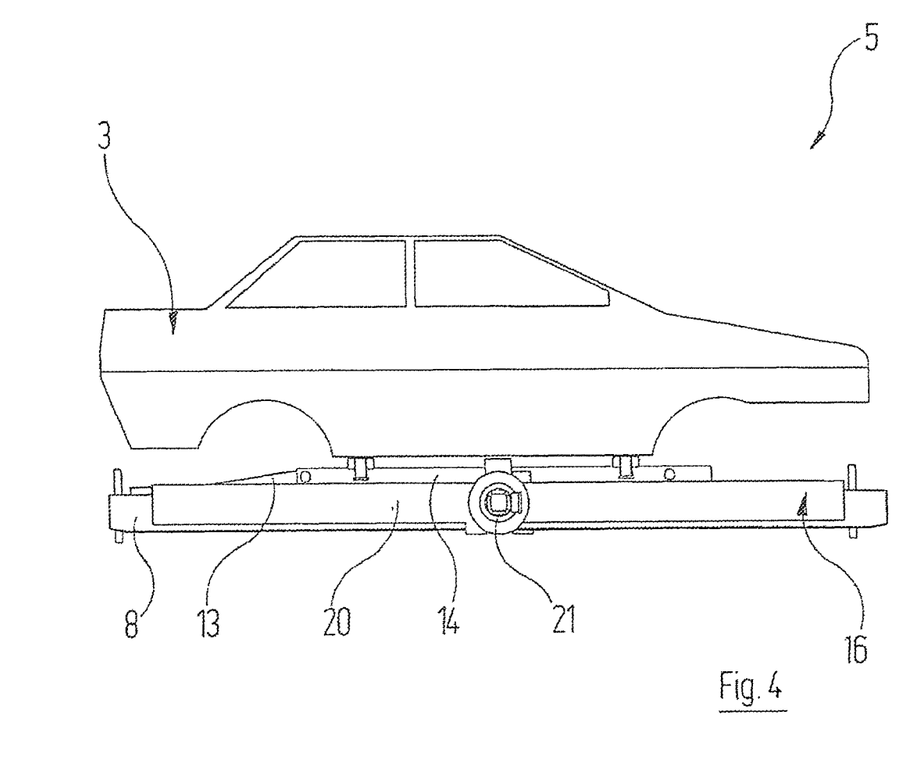
FIG. 4 shows the side view for FIG. 3.
Figure 5:
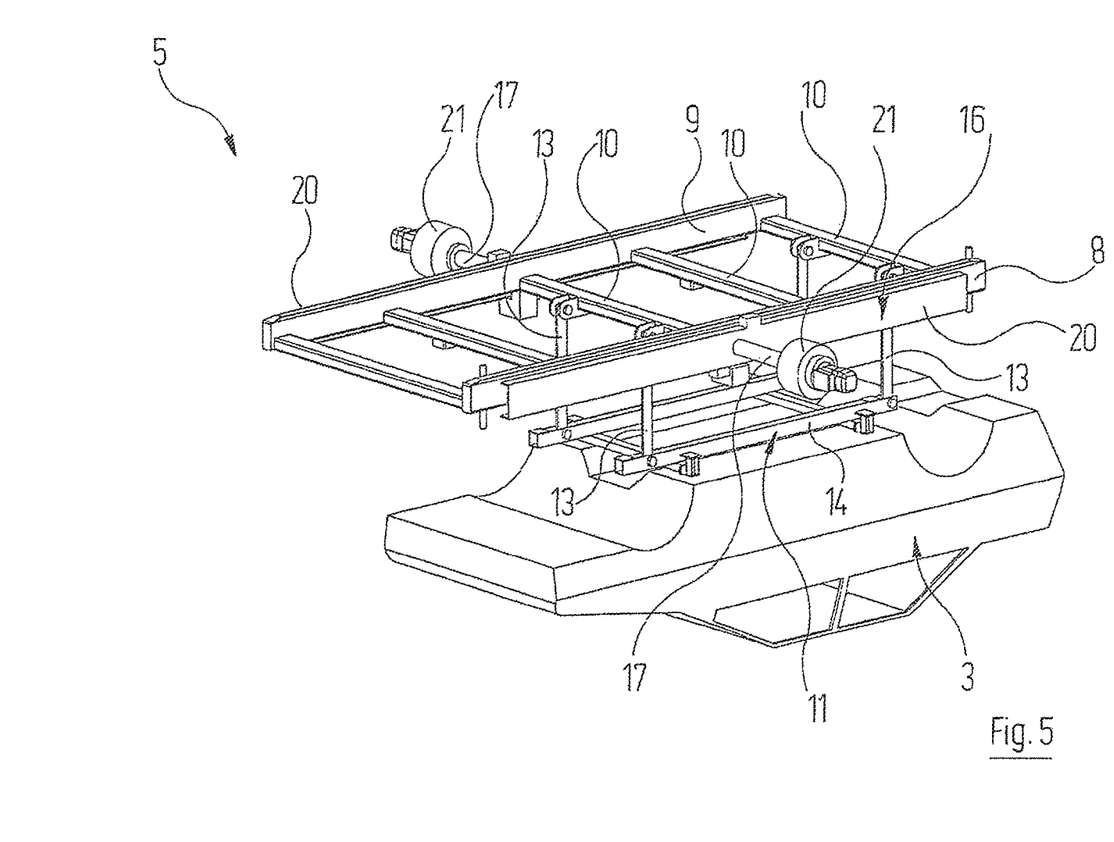
FIG. 5 shows, in perspective, the turning platform from FIG. 3 with a vehicle body, but turned through 180°.
Figure 6:
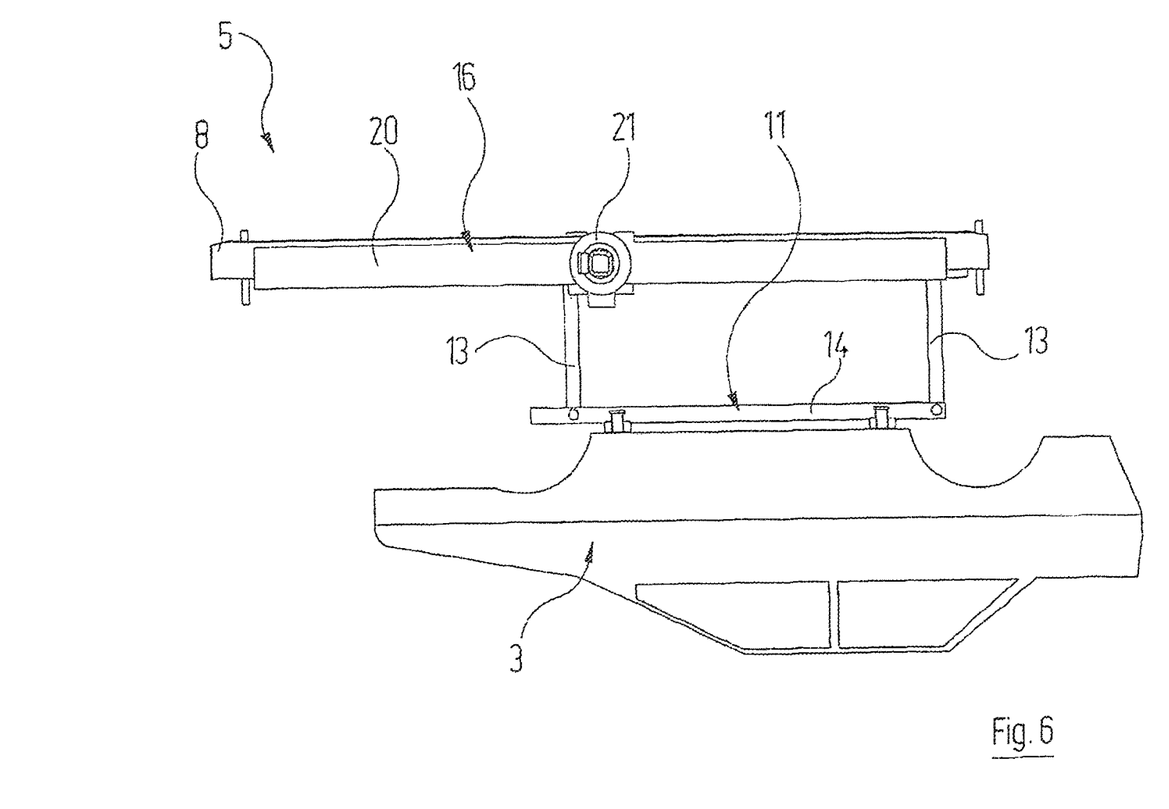
FIG. 6 shows the side view for FIG. 5.
Figure 7:
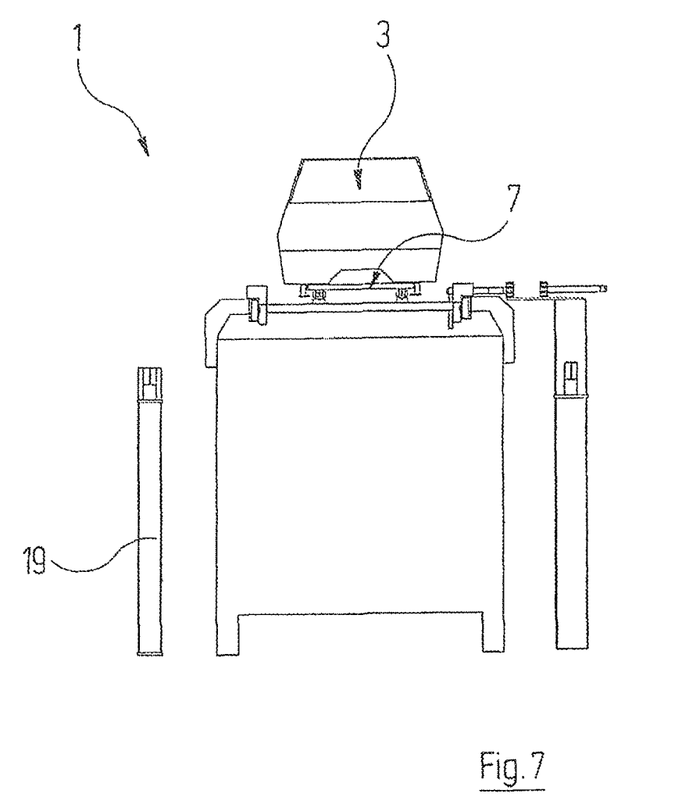
FIG. 7 shows a section through the system from FIGS. 1 and 2 along the line B-B from FIG. 2, on a larger scale.
Figure 8:
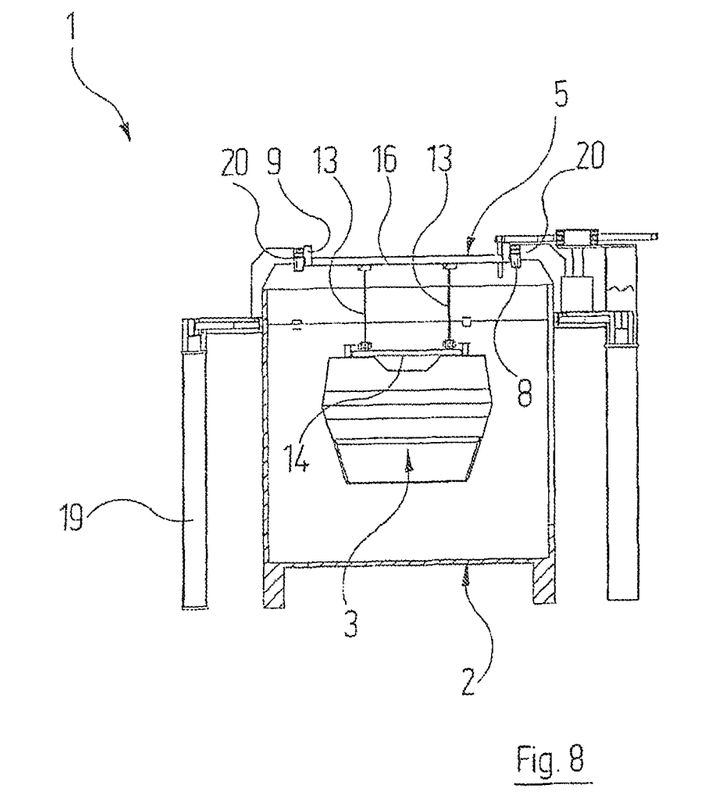
FIG. 8 shows a section similar to FIG. 2, but along the line C-C from FIG. 2.

The system for electrophoretic dip coating vehicle bodies, parts of which are illustrated in FIGS. 1 and 2 and which is designated overall by reference numeral 1, should be understood as an example of a system for dip treating vehicle bodies. As its main component, it includes a dip tank 2 which in the condition ready for operation is filled with paint up to a certain level. The vehicle bodies 3 to be painted are guided through the system 1 from left to right, as seen in FIG. 1, with the aid of a transport system 4. The system is interrupted by two stationary turning stations 5, 6, with the result that there is an entry portion 4a, an intermediate portion 4b and an exit portion 4c of the transport system 4 in the region of the dip tank 2.

Figure 10:
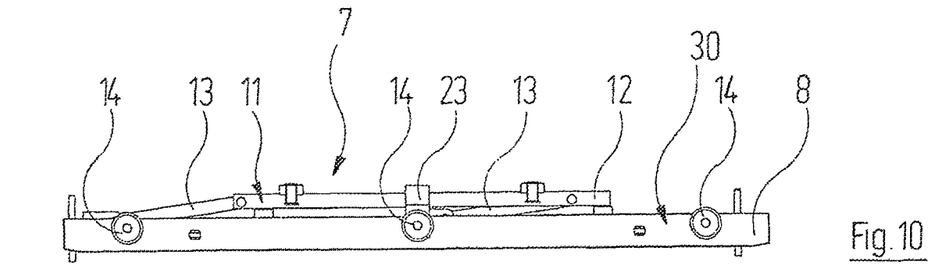
FIG. 10 shows the side view of the mounting frame from FIG. 9, without the vehicle body.
Figure 11:
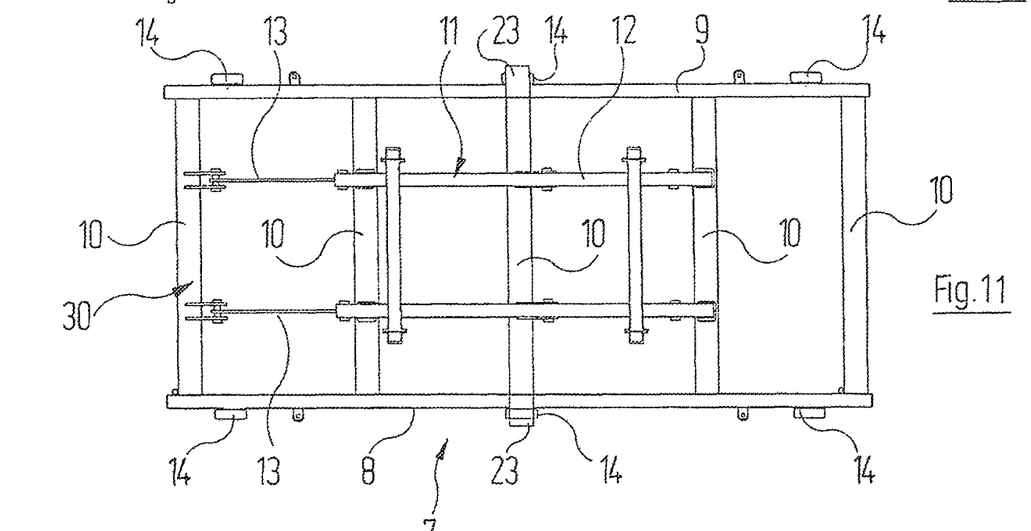
FIG. 11 shows a plan view of the mounting frame.
Figure 12:
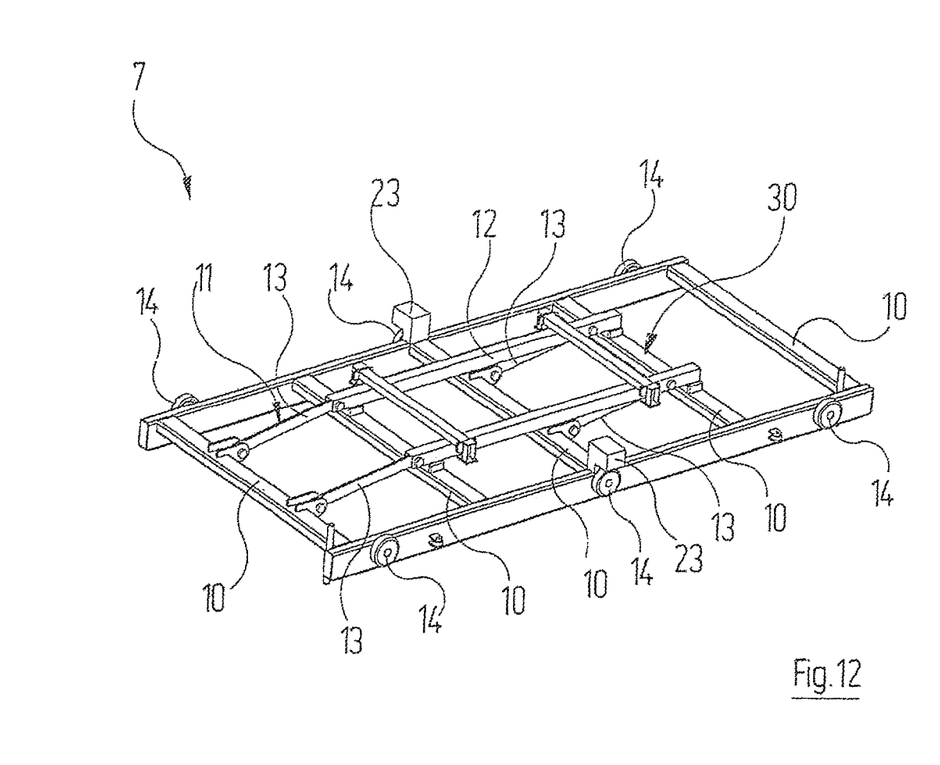
FIG. 12 shows, in perspective, the mounting frame without the vehicle body.

The vehicle bodies 3 are guided through the entire system on the transport system 4 with the aid of mounting frames 7, so-called skids, as illustrated in more detail in FIGS. 10 to 12. Skids as such are known for the transport of vehicle bodies. They are generally distinguished by the fact that they have two parallel runners 8, 9 which are fastened to a basic frame and cooperate with a known conveying system, frequently roller conveyor systems, in regions of the automotive manufacture beyond the system described here. So that the skid 7 described here can also be used in these other regions, it too has runners 8, 9 of this kind. In the exemplary embodiment illustrated, these runners 8, 9 are connected to one another by five struts 10 that run perpendicular thereto and in the present case form the basic frame 30.

Figure 9:
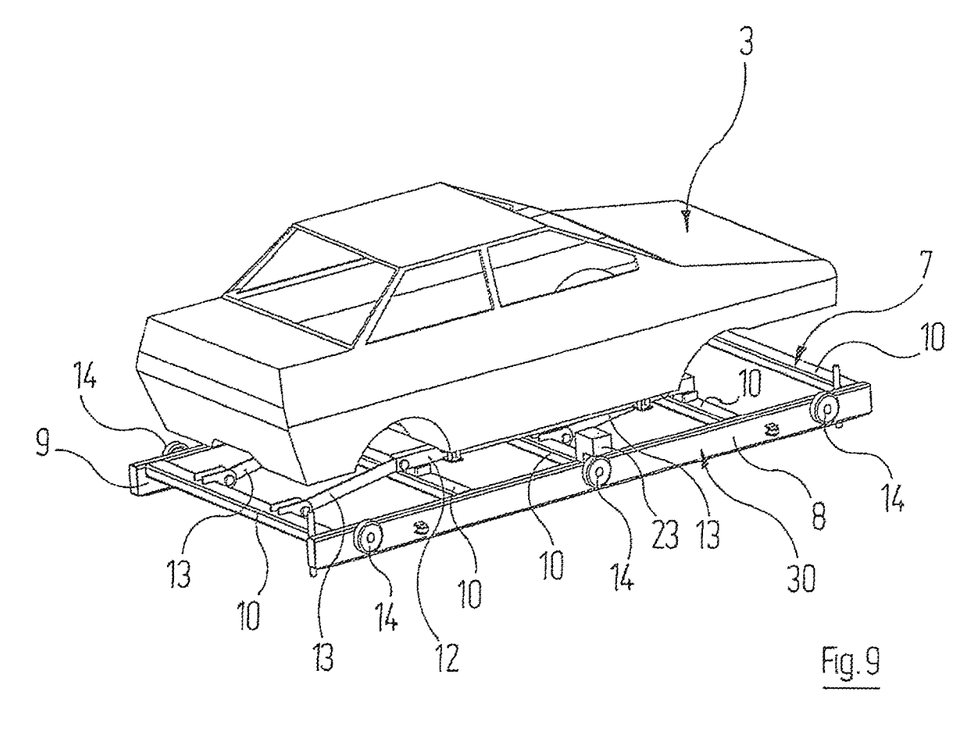
FIG. 9 shows a perspective view of a movable mounting frame with a vehicle body placed thereon as used in the system from FIG. 1.

Whereas the vehicle bodies are fastened rigidly to known skids, so in particular cannot move in relation to the runners and the basic frame, the skid 7 illustrated here has a fastening device 11 which can move in relation to the basic frame 30. This fastening device 11 includes a rectangular frame 12 which forms a retaining structure on which the vehicle body 3 may be fastened using conventional fastening means, in known manner. This is illustrated in FIG. 9.

The frame 12 is connected to the basic frame by way of four pivotal arms 13, in the manner of a parallelogram guide. Two of these pivotal arms 13 are mounted on the trailing end, as seen in the direction of movement, of the frame 12 in articulated manner and are connected in articulated manner at their opposite ends to the strut 10 of the basic frame 30 which is the furthest to the left as seen in FIG. 12. Two more of these pivotal arms 13 are similarly laid in articulated manner between the leading region, as seen in the direction of movement, of the frame 12 and the middle strut 10. Thus, the overall arrangement is that when the pivotal arms 13 pivot, the frame 12 of the fastening device can move parallel to itself and perpendicular to the basic frame 30, a certain translational movement of the frame 12 naturally being associated with this pivotal movement.

A further difference between the skids 7 used here and known ones is that rollers 14 are mounted on the outwardly pointing side faces of the runners 8, 9.

Both turning stations 5, 6 are in principle constructed in the same way, with the result that a description referring to FIGS. 3 to 8 and 13 of the construction and operation of the turning station 5 that is on the left in FIGS. 1 and 2, which serves to dip the vehicle bodies 3 in the paint in the dip tank 2, is sufficient.

The construction of a turning station 5 is relatively simple. It includes two short rotational axes 17 which are flush and extend transversely to the direction of conveying (cf. in particular FIG. 5) and are mounted on either side of the dip tank 2 in bearing blocks 18, as can be seen from FIGS. 1 and 2. The bearing blocks 18 are fastened to a steel construction 19 which in particular also carries the entire transport system 4. Each rotational axle 17 is connected to a guide rail 20 such that it cannot rotate in relation to the guide rail 20, which has a profile of this kind and is aligned with the direction of movement of the transport system 4. The two guide rails 20 are spaced from one another by an amount such that they can receive the runners 8, 9. In this case, the rollers 14 on the runners 8, 9 of the skid 7 run on the inner face of the guide rails 20. The gui- Both rotational axles 17 may be rotated synchronously with the aid of two geared motors 21 which are arranged on opposing sides of the dip tank 2. The two rotational axles 17 and the two guide rails 20 thus form an operational unit, here designated the turning platform 16. The two guide rails 20 could therefore also be rigidly connected to one another. The embodiment of the turning platform 16 that is described has the advantage that there is space available in the central region between the axles 17, which may be used in another way.

may.

The portions 4a, 4b and 4c of the transport system 4 are constructed as conventional roller conveyors. Movement of the vehicle bodies 3 onto the turning platforms 16 and away therefrom is brought about with the aid of a slide mechanism which is not illustrated in detail here and which acts on the skids 7 using chain-driven entraining means.

The guide rails 20 of the turning platforms 16 each have on their upper side a stop 22. The basic frame of the skids 7 also has, on opposing sides, stops 23 which project laterally outwards beyond the runners 8, 9 such that they can cooperate with the stops 22 of the guide rails 20 of the turning platforms 16.

Operation of the system described above is as follows:

The vehicle bodies 3 to be painted are conveyed in from the left, as seen in FIGS. 1 and 2, with the aid of the entry portion 4a of the transport system 4. During this, they are mounted on the fastening device 11, or to be more precise on the frame 12 thereof. The parallelogram which is formed in side view by the frame 12, the pivotal arms 13 and the basic frame 30 of the skid 7 is folded flat, as can be seen from FIGS. 9 and 10. The bodies 3 are thus conveyed over the transport system 4 at the minimum possible height.

When the vehicle bodies 3 reach the region of the first turning station 5, the slide system which is mentioned above but not illustrated takes over further transport of the skid 7 carrying the vehicle body 3 and pushes it onto the turning platform 16 of this turning station 5. During this, the runners 8, 9 of the skid 7 are introduced into the guide rails 20 of the turning platform 16; at the same time, the rollers 14 on the outer sides of the runners 8, 9 run on the inside of the guide rails 20. The skid 7, with the vehicle body 3 fastened thereon, is pushed onto the turning platform 16 until the stops 23 on the skid 7 come into abutment against the stops 22 on the turning platform 16. Then, if necessary, the skid 7 may be locked on the turning platform 16 in a suitable manner. The condition illustrated in FIGS. 3 and 4 has now been reached.

Figure 13:
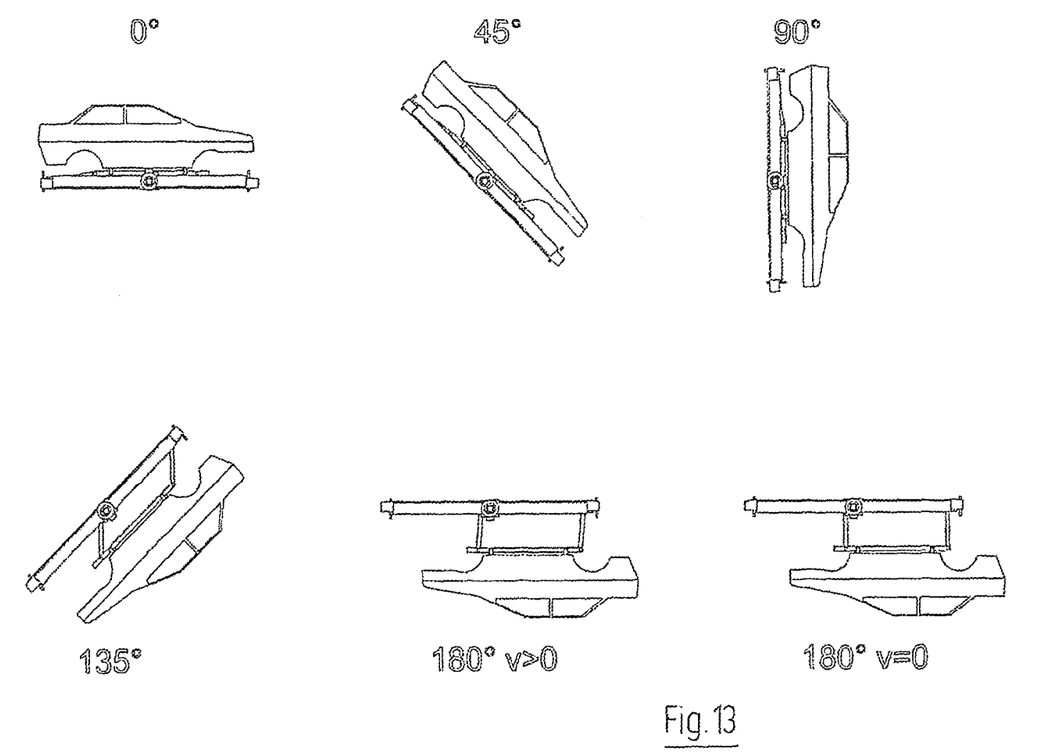
FIG. 13 shows various phases of turning as a vehicle body is dipped into a paint tank.

Current is now supplied to the geared motors 21, with the result that the turning platform 16 begins to turn clockwise. In so doing it moves through an angle of 180°. As can be seen from the top row of the individual figures in FIG. 13, the parallelogram between the frame 12 of the fastening device 11 and the basic frame 30 of the skid 7 remains "folded up" until it reaches a position of approximately 90°. If the turning movement continues, the parallelogram begins to open under the effect of gravity, as illustrated in the part of the figure bottom left in FIG. 13, for a rotational angle of 135°. Once the full rotational angle of 180° has been reached, the parallelogram becomes a rectangle; the frame 12 of the fastening device 11 is now at the maximum spacing from the basic frame 30 of the skid 7, corresponding to the length of the pivotal arms 13. If the parts of the figure for 0° and for 180° (v=0) in FIG. 13 are compared, it is seen that the undipped vehicle body 3 (0°) is at a much smaller spacing from the turning platform 16 in the vertical direction than it is in the fully dipped condition)(180°).

The vehicle body 3 may remain in the dipped position (rotational angle of 180°) for a certain time, as desired. Sooner or later it and the skid 7 carrying it are pushed, in the suspended position, onto the intermediate portion 4b of the transport system 4 with the aid of a similar slide mechanism. There it is now moved on in conventional manner, moving through the paint in the dip tank 2. Because of the viscosity of this paint, the parallelogram between the frame 12 and the basic frame 30 of the skid 7 will adopt a somewhat oblique position, as can be seen from the part of the figure in the centre of the bottom row of FIG. 13.

Once the vehicle body 3 has passed through the intermediate portion 4b of the transport system 4 in this suspended position, it is pushed onto the turning platform 16 of the second turning station 6, again with the aid of a slide mechanism. The turning platform 16 of this second turning station 6 is now turned, with the aid of the associated geared motors 21, in opposition to the direction of turning in the first turning station 5, that is to say anticlockwise. In principle, however, it is also conceivable to perform the turning movement as the vehicle body 3 is raised from dipping in the same turning direction as the dipping.

Once the vehicle body 3 has regained its substantially horizontal position, raised from dipping, on the turning platform 16 of the second turning station 6, it can be pushed, with the aid of a further slide mechanism which is not illustrated, onto the exit portion 4c of the transport system 4 and there transported on in conventional manner.

Various other treatment stations which also have dip tanks filled with certain treatment liquids and through which the vehicle bodies 3 are guided in the same way as was described above for the electrophoretic dip tank may be placed upstream and downstream of the described part of a dip coating system 1.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A system for dip coating articles comprising:
   a) at least one dip tank which is capable of being filled with a treatment liquid up to a level;
   b) a transport system which moves the articles up to and away from the dip tank;
   c) at least one stationary turning station which is provided at the dip tank and has a turning platform, and on which at least one article is fastened and which is capable of being turned from a first position in which the at least one article is above the level of the treatment liquid to a second position in which the article is below the level of the treatment liquid, and/or is capable of being turned in the opposite direction between these two positions;
   wherein
   d) each article is capable of being fastened to a skid which cooperates with the transport system and is capable of being fixed on the turning platform of the turning station, wherein the skid has a basic frame and a fastening device for the article;
   and wherein,
   e) the fastening device of the skid is constructed such that the spacing between the article and the basic frame of the skid changes during turning on the turning platform of the turning station such that the article fastened on the fastening device is at a smaller spacing from the turning platform in the first position, than in the second position;
   f) the fastening device includes a rectangular frame, which forms a retaining structure on which the article may be fastened; and
   g) the frame of the fastening device is connected to the basic frame by way of four pivotal arms, in the manner of a parallelogram guide.

2. The system according to claim 1, wherein the skid includes a runner which has rollers which cooperate with guide rails on the turning platform of the turning station.

* * * * *